(12) United States Patent
Kim

(10) Patent No.: US 10,246,160 B2
(45) Date of Patent: Apr. 2, 2019

(54) PEDAL

(71) Applicant: Yoo Chul Kim, Siheung-si (KR)

(72) Inventor: Yoo Chul Kim, Siheung-si (KR)

( * ) Notice: Subject to any disclaimer, the term of this patent is extended or adjusted under 35 U.S.C. 154(b) by 0 days.

(21) Appl. No.: 15/612,191

(22) Filed: Jun. 2, 2017

(65) Prior Publication Data

US 2017/0355418 A1  Dec. 14, 2017

(30) Foreign Application Priority Data

Jun. 13, 2016 (KR) ........................ 10-2016-0073300

(51) Int. Cl.
*B62M 3/08* (2006.01)
*A63B 21/00* (2006.01)

(52) U.S. Cl.
CPC ........... *B62M 3/08* (2013.01); *A63B 21/4034* (2015.10)

(58) Field of Classification Search
CPC .............................. B62M 3/08; A63B 21/4034
USPC ........................................................ 74/594.4
See application file for complete search history.

(56) References Cited

U.S. PATENT DOCUMENTS

| | | | | |
|---|---|---|---|---|
| 533,180 A * | 1/1895 | Perkins | ..................... | B62M 3/08 74/594.4 |
| 2,337,246 A * | 12/1943 | Mart | ....................... | B62M 3/08 74/594.7 |
| 4,599,915 A * | 7/1986 | Hlavac | ..................... | B62M 3/08 74/594.4 |
| 5,257,562 A * | 11/1993 | Nagano | ..................... | B62M 3/08 74/594.2 |
| 5,279,184 A * | 1/1994 | Ogino | ..................... | B62M 3/086 36/131 |
| 2011/0088508 A1 * | 4/2011 | Chen | ........................ | B62M 3/08 74/594.6 |
| 2012/0312119 A1 * | 12/2012 | Kim | ........................ | B62M 3/08 74/594.4 |
| 2013/0061715 A1 * | 3/2013 | Kim | ........................ | B62M 3/08 74/594.7 |
| 2015/0023033 A1 * | 1/2015 | Kuo | .......................... | B62J 6/00 362/473 |

FOREIGN PATENT DOCUMENTS

| | | | |
|---|---|---|---|
| FR | 2446760 | * | 8/1980 |
| GB | 167121 | * | 8/1921 |

* cited by examiner

*Primary Examiner* — Vinh Luong
(74) *Attorney, Agent, or Firm* — Kirton McConkie; Evan R. Witt

(57) ABSTRACT

A pedal for use in pedal exercise equipment such as a bicycle, in which a sole is stably placed on a pedal body while the stepping angle of the sole is adjusted in the right and left directions within a predetermined range. The pedal includes a pedal body; a plurality of brake pads provided at a predetermined interval from each other on the front surface and the rear surface of the pedal body such that one side surface of each of the plurality of brake pads is in contact with the front surface or the rear surface of the pedal body; and inclination control plates respectively positioned at the front side and the rear side of the pedal body, and having a plurality of brake mounting grooves which are formed on one side surface thereof and into which the brake pads are inserted and fixed.

2 Claims, 11 Drawing Sheets

Prior Art

Prior Art

PEDAL

BACKGROUND OF THE INVENTION

Field of the Invention

The present invention relates to a pedal used in various pedal exercise equipment such as bicycles, and more particularly to, a pedal, in which the stepping angle of a sole on a pedal body may be controlled in a predetermined range in the right and left directions, so that it is possible to realize stable pedal stepping on the pedal body.

Description of the Related Art

Recently, there have been suggested various kinds of pedal exercise equipment to which the present invention relates. There are, for example, bicycles for traveling roads by rotating wheels using pedals, bicycle type exercise equipment for carrying out leg exercise on the spot, or the like.

FIG. 1 shows a perspective view of a prior art pedal in an assembled state.

In pedal exercise equipment as shown in FIG. 1, a pedal 100' is connected to a driving sprocket 300' via a crank rod 200' and the driving sprocket 300' is connected to a driven sprocket, which is connected to wheels via chains.

The pedal 100' includes: a connection shaft 110' which is connected to the crank rod 200'; and a rectangular pedal body 120' mounted to the connection shaft 110' for freely rotating and contacting a sole, wherein the body 120' is kept horizontally with respect to the ground surface when the connection shaft 110' is connected to the crank rod 200'.

Therefore, the stepping angle of the sole of a user, which contacts the top surface of the pedal body 120', has a horizontal state, so that the sole of the user may be slipped in the right or left direction of the pedal body 120' according to the shape of the sole of the user when the crank rod is rotated by pressing the pedal body 120'. Particularly, if the degree of slippage in the direction opposite the crank rod connection side is severe, the sole of the user may deviate from the pedal body 120' to the outside.

In addition, the pedal 100' promotes effective pedal exercise, wherein a large driving force may be obtained from a small force because a moment value becomes increased as the foot effort is more concentrated on the opposite side of the crank rod connection side in the stepping portion of the pedal body 120'. However, in the prior art pedal 100' as shown in FIG. 1 and FIG. 2, the pedal body 120' is formed as a single part and all the top surface and the bottom surface of the pedal body 120' are formed horizontally. Therefore, it is difficult to concentrate the foot effort to the opposite side of the crank rod connection side of the pedal body 120'. In addition, if the foot effort is concentrated on the opposite side of the crank rod connection side of the pedal body 120', the sole is more likely to slip to the outside of the pedal body 120', deviating from the pedal body 120'.

Therefore, in order to make the foot effort to be concentrated on the opposite side of the crank rod connection side of the pedal body 120' while stably securing the sole to the pedal body 120', it is preferable to form the pedal body 120' with an inclination such that the top surface and the bottom surface are high at the opposite side of the crank rod connection side and low at the crank rod connection side, thereby positioning the stepping angle of the sole on the top surface of the pedal body in an inclined state.

Meanwhile, it is known that, in the unloaded state, statistically 87% of human feet have the varus phenomena, 9% have the valgus phenomena in the state that a load is not applied thereto and only 4% are in parallel to the surface of ground at foreparts thereof.

Of course, the above phenomena are normal characteristics of humans and serve as suspension to absorb impacts from the ground at the time of walking.

However, in the case of pedaling, the entire forepart of a foot comes in contact with a pedal. Therefore, joint portions, which are vertically maintained at the time of walking, are bent inwards or outwards according to the twisted degree of a sole. This deformation of joint portions causes pain or damage and results in the loss of vertical force.

In order to find out the phenomenon that a user's foot has, it would be better for the user to straightly stand up in front of a mirror and lift one of his legs.

If the shape of his foot reflected on the mirror is close to any one of the two views, which is the natural shape of his foot.

FIG. 3 is a view showing a varus foot, and FIG. 4 is a view showing a valgus foot. In addition, FIG. 5 is a view showing a case, in which a foot is biased to the outside due to the varus phenomenon during pedaling, and FIG. 6 is a view showing a foot, wherein force is ideally distributed over the foot during pedaling.

In the case of a varus foot as shown in FIG. 5, force (pressure) concentrated between a pedal and a foot is biased outwards, decreasing pedaling efficiencies. If force is ideally distributed as shown in FIG. 6, the force applied to the foot is maximized and stable pedaling may be expected.

In addition, in the case of a varus or valgus foot, a knee may come inwards or go outwards at the time of pedaling.

The problems of cyclists who complain pain at the outside or inside portion of knees are mostly resulted from the varus and valgus phenomena. Even though there is no pain revealed, if force is not vertically applied during pedaling, the force is likely to be lost, decreasing the pedaling efficiencies.

FIG. 7 is a view showing a leg, wherein a knee comes inwards by the varus foot during pedaling, and FIG. 8 is a view showing a leg during ideal pedaling.

As described above, in order to overcome the varus and valgus phenomena and thus carry out ideal pedaling, it is necessary to control a pedal stepping angle in the right and left directions according to the body type of a user. However, it is not possible to adjust the pedal stepping angle in the right and left directions in the prior art pedals, including the pedal as shown in FIG. 1. Further, in order to set an ideal pedal stepping angle in the right and left direction in the prior art pedals, it is necessary to complicatedly mount an additionally prepared wedge to the front and rear surfaces of the pedal body.

Accordingly, a prior art pedal for solving the above-mentioned problems and hassle has been disclosed in Korean Patent No. 10-1264993. Referring to FIG. 2, the prior art pedal 10 includes a connection shaft 11 connected to the crank rod of pedal exercise equipment, a pedal body 12 rotatably connected to the connection shaft 11, inclination control plates 30 respectively inserted into and provided to the upper front and rear portions and lower front and rear portions in the pedal body 12 and having a hinge pin connection hole 31 respectively formed at both side end portions of the front surface thereof, hinge pins 40 respectively inserted into the hinge pin connection holes 31 of the respective inclination control plates 30 in the back and forth direction and respectively having an adjustment bolt coupling hole 41 formed in the center of an outer circumference in the up and down direction, and adjustment bolts 50 having male screw parts 52, 53, which are formed at upper and lower portions thereof so as to be connected to the hinge pins 40, and respectively provided to the left front and rear portions and right front and rear portions in the pedal body 12 so as to adjust the left and right protrusion amounts of the inclination control plates 30 in the vertical direction. According to the prior pedal described above, a sole stepping angle can be freely adjusted through the adjustment bolts 50 within a certain range by the inclined projection of each of the inclination control plates 30 at the upper end and the lower end of the pedal body 12. In addition, as for the inclination angle, the stepping angle of the pedal 10 can be ideally set to be suitable for all body types of the users having the varus or the valgus, since the inclination angle can be set for both directions from the right to the left and from the left to the right. Therefore, force is ideally distributed during pedaling, maximizing the force acting on the foot, thereby stabilizing the pedaling, reducing fatigue, and significantly decreasing the risk of pain and injury.

However, this prior art pedal still has the inconvenience that, in order to use the pedal 10, each user who wants to use the pedal 10 has to individually adjust the inclination control plates 30 by using the adjustment bolts 50 such that the inclination control plates 30 are protruded with an inclination at the upper and lower ends of the pedal body 12 according to the sole stepping angle of the user.

SUMMARY OF THE INVENTION

Problems that the Invention is to Solve

Therefore, the present invention is derived to resolve the above and any other problems and disadvantages of the prior art pedal, and has an object to provide a pedal, in which the inclination angles of inclination control plates are set to be in accordance with the stepping angle of a sole while moving according to a load applied to a pedal body, thereby realizing ideal pedaling and greatly improving the pedaling efficiency while reducing the fear of pain and injury.

The present invention has another object to provide a pedal, in which a pedal stepping angle is automatically set to the most optimum angle for the foot of a cyclist according to the load of the cyclist, which is applied to a pedal body, such that the pedal can be in accordance with the sole stepping angle of each user, who uses the pedal, even though inclination control plates are not respectively adjusted for the user.

Means for Solving the Problem

In order to accomplish the above objects, there is provided a pedal, including: a connection shaft coupled to the crank rod of pedal exercise equipment; a pedal body rotatably connected to the connection shaft; a plurality of brake pads provided at a predetermined interval from each other on the front surface and the rear surface of the pedal body such that one side surface of each of the plurality of brake pads is in contact with the front surface or the rear surface of the pedal body; inclination control plates respectively provided at the front side and the rear side of the pedal body such that both right and left side portions can move in the vertical direction during the rotation with respect to hinge screws in a state, in which the other side portions of the brake pads are inserted and fixed into one surfaces thereof; and coupling screws penetrating the both right and left side end portions of the inclination control plates and screw-coupled to both the right and left side end portions of the front surface and the rear surface of the pedal body.

Meanwhile, the inclination control plate has a plurality of brake mounting grooves which are formed on one side surface thereof and into which the other side portions of the brake pads are inserted and fixed, a hinge screw through hole formed in the center thereof and into which the hinge screw is inserted, and coupling screw through holes formed penetrating both the right and left end portions of the inclination control plate long in the vertical direction.

In addition, hinge screw coupling holes are respectively formed in the center portions of the front surface 105 and the rear surface 106 of the pedal body 110 such that the hinge screws penetratingly inserted into the hinge screw through holes of the inclination control plates are coupled to the hinge screw coupling holes, and coupling screw holes 111 are formed in both the right 107 and left side 108 portions of the front surface and the rear surface of the pedal body 110, which has the hinge screw coupling hole 112, such that the coupling screws 170 penetratingly inserted into the coupling screw through holes 143 of the inclination control plates 140 are coupled to the coupling screw coupling holes 111.

Meanwhile, it is more preferable that washer bushings 150 are respectively formed with a through hole 151 having the same center and the same inner diameter as the hinge screw coupling holes 112 and the coupling screw coupling holes 111, and inserted into the hinge screw through holes 142 and the coupling screw through holes 143 in the shape of an elongated hole, which are formed in the inclination control plates 140, such that the hinge screws 160 and the coupling screws 170 can respectively pass through the inside of the through holes (151).

Effects of the Invention

According to the present invention, the pedal of the present invention is derived to automatically set the stepping angle of the pedal most suitable to a user's sole according to the load applied to the pedal body with respect to the hinge screw so that anyone can use the pedal, wherein both the left and right sides of the inclination control plates protrude up and down and the stepping angle suitable for the shape of the sole is automatically set so that each user who uses the pedal does not need to adjust the inclination control plates to match the stepping angle of his sole, regardless of the varus or the valgus.

Furthermore, according to the present invention, force is ideally distributed on his feet at the time of pedaling, such that the force applied to his feet may be maximized and stable pedaling may be expected, noticeably reducing a fatigue degree and the concern of pain or damage.

BRIEF DESCRIPTION OF THE DRAWINGS

The objects, features and advantages of the present invention will be more clearly understood from the preferred embodiments in the following detailed description in conjunction with the accompanying drawings, in which.

Description of Reference Numerals and Signs

Figure 1:
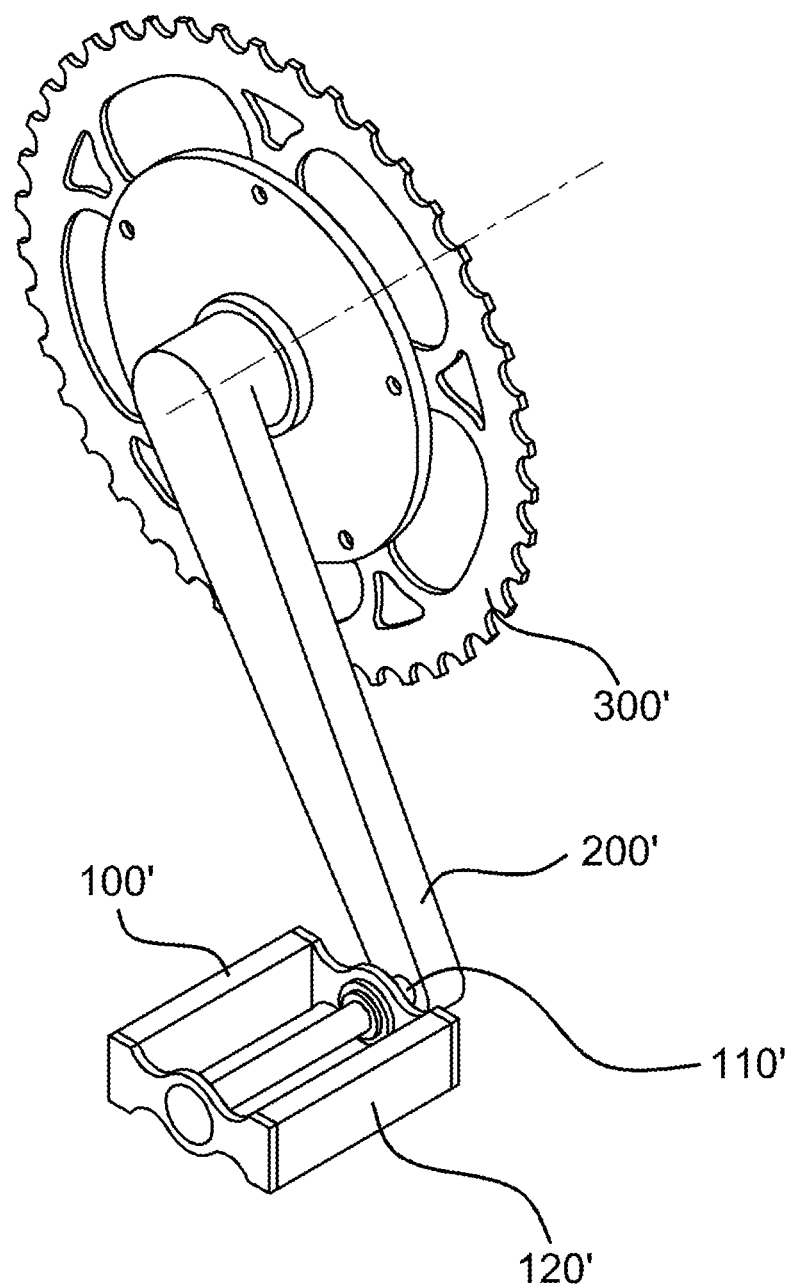
FIG. 1 is a perspective view of a prior art pedal, wherein the pedal is in the mounted state.
Figure 2:
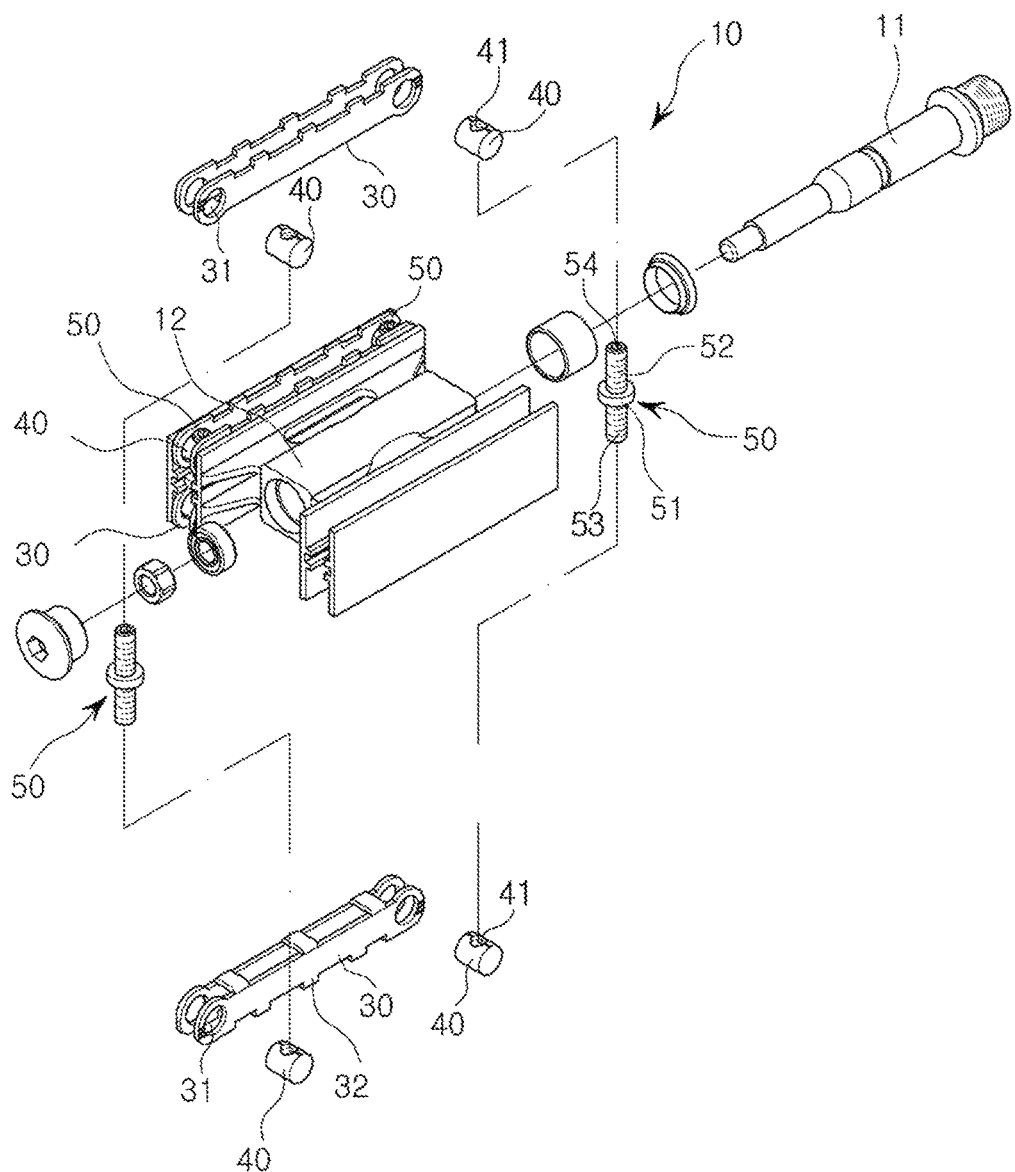
FIG. 2 is an exploded perspective view of another prior art pedal.
Figure 3:
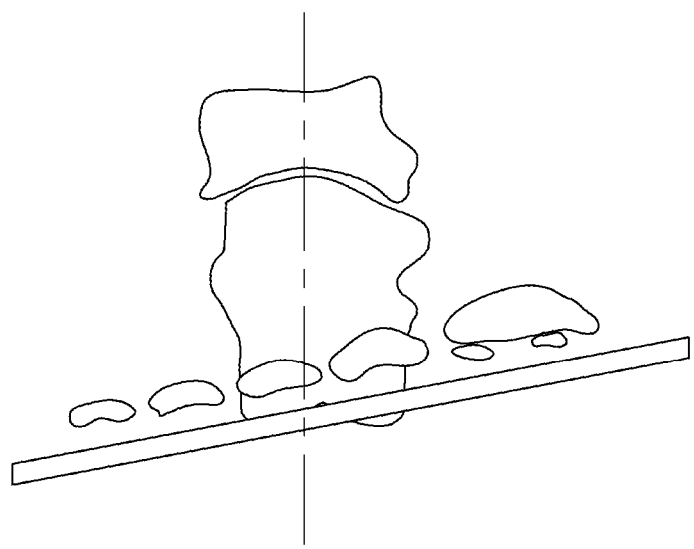
FIG. 3 is a view showing a varus foot.
Figure 4:
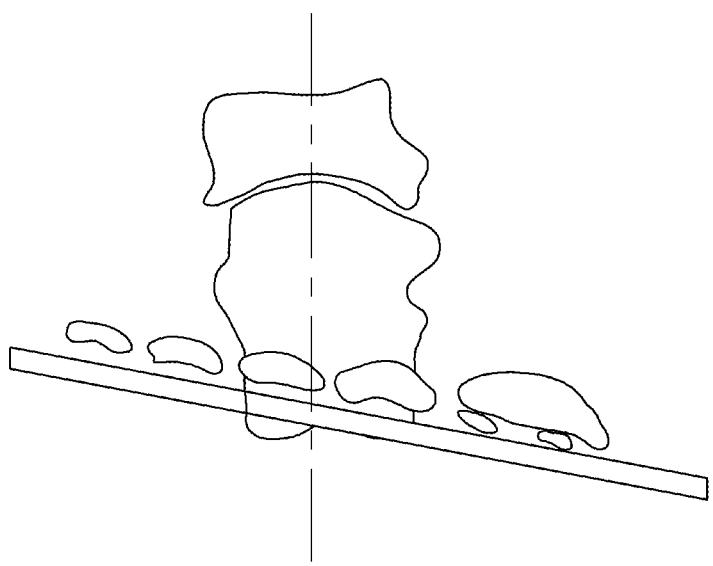
FIG. 4 is a view showing a valgus foot.
Figure 5:
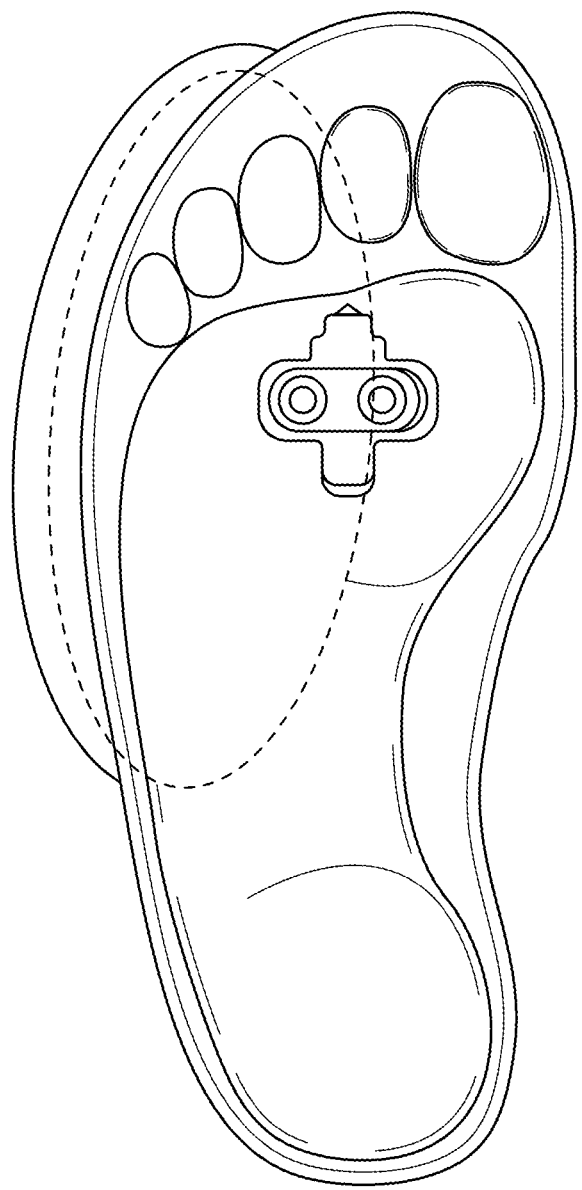
FIG. 5 is a view showing a case, in which a foot is biased to the outside due to the varus phenomenon during pedaling.
Figure 6:
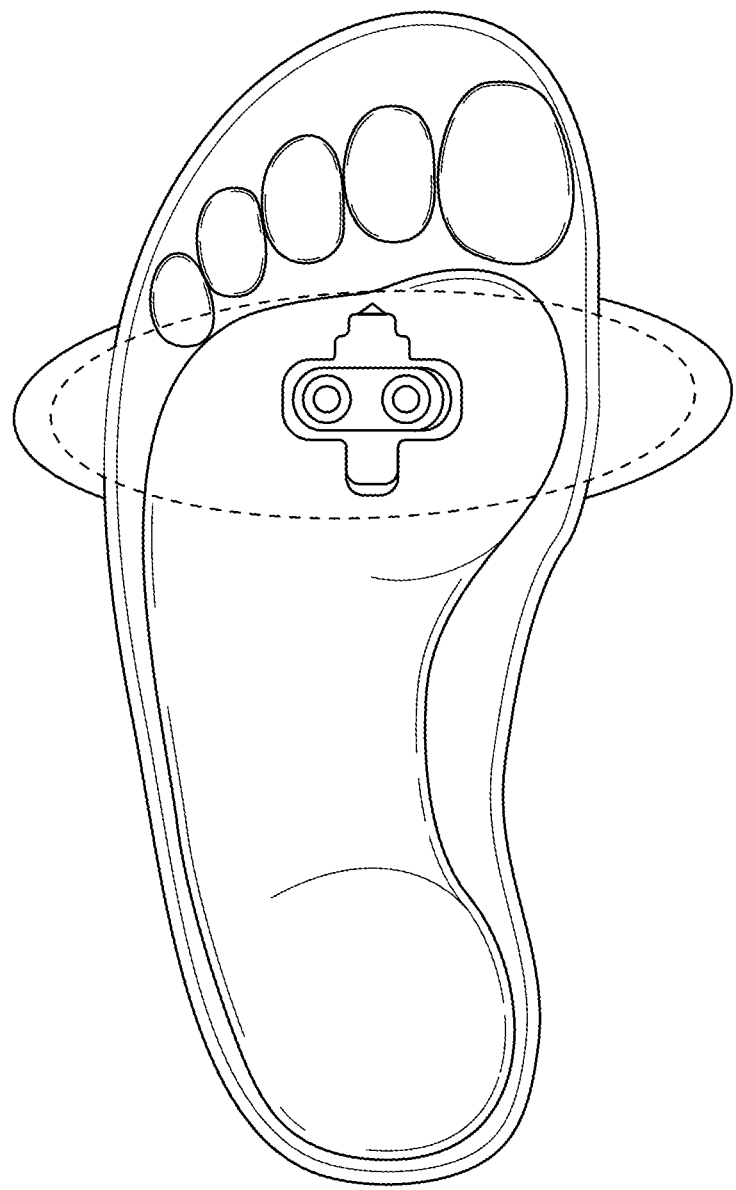
FIG. 6 is a view showing a foot, wherein force is ideally distributed during pedaling.
Figure 7:
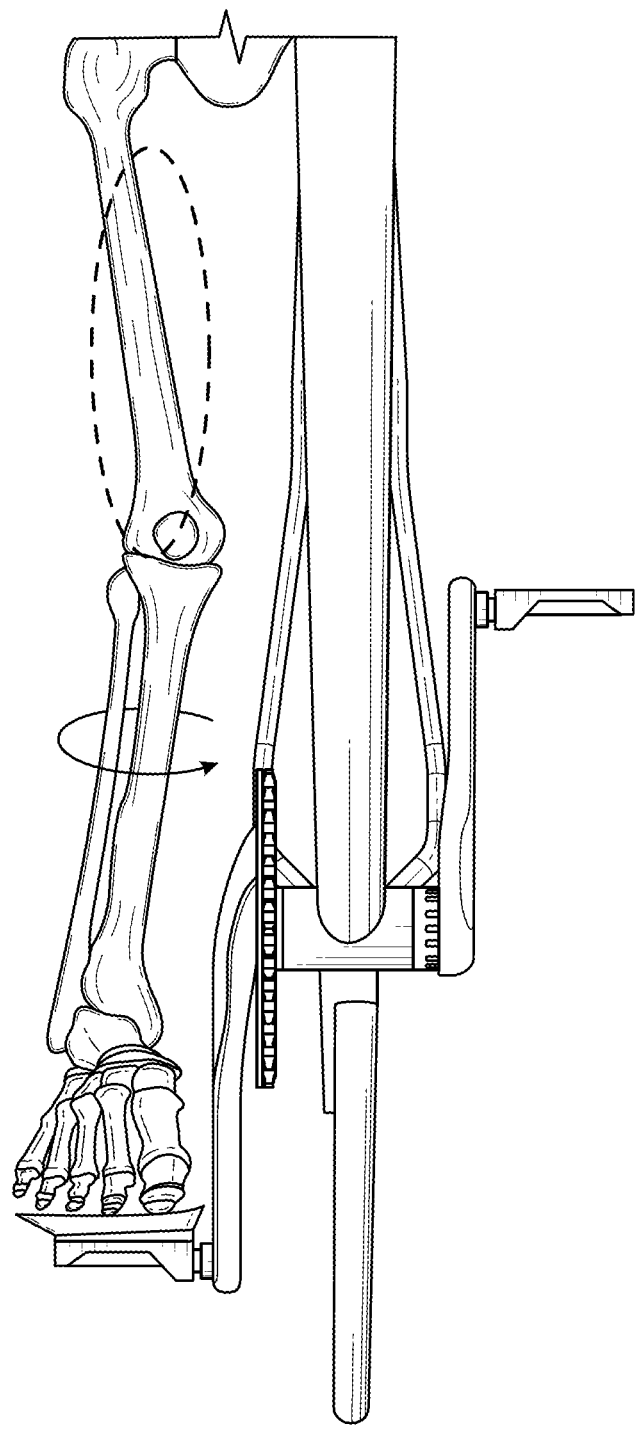
FIG. 7 is a view showing a symptom, in which a knee comes inwards due to varus phenomenon during pedaling.
Figure 8:
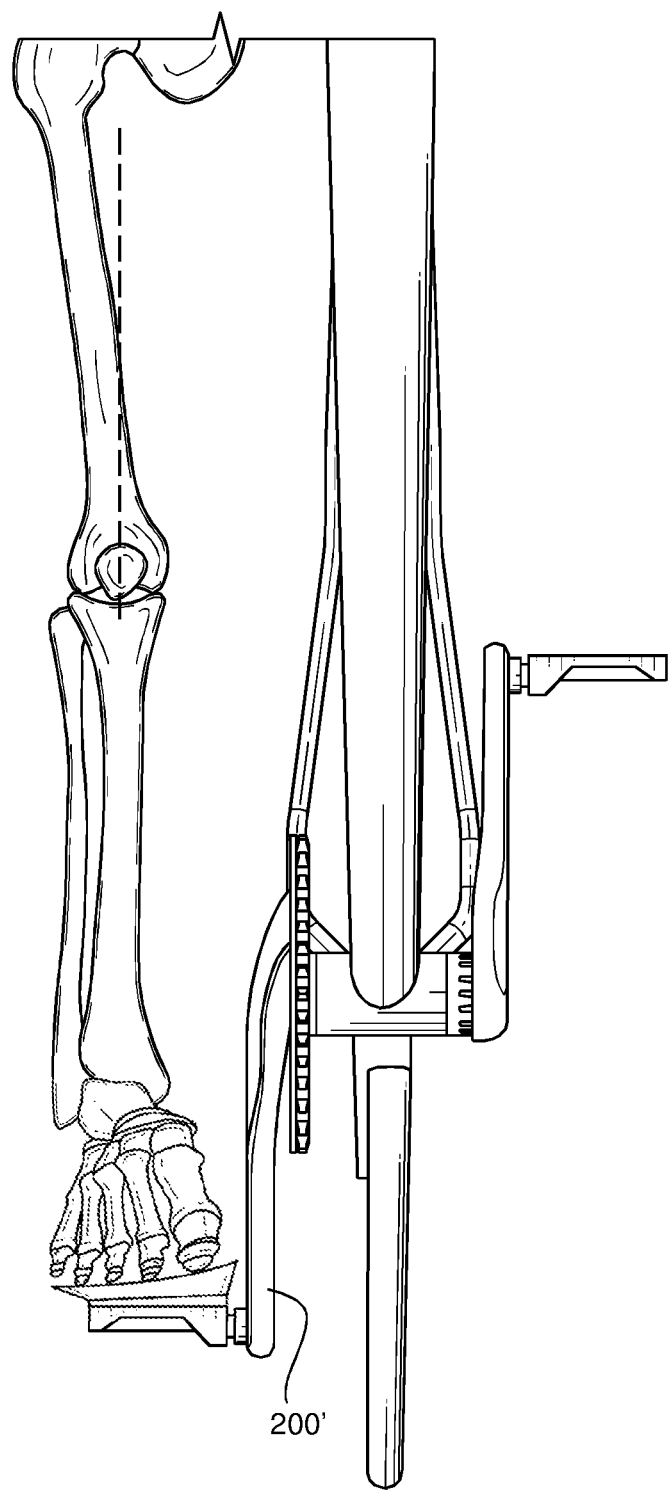
FIG. 8 is a view showing an ideal pedaling shape.

100: pedal
110: pedal body
111: coupling screw coupling hole
112: hinge screw coupling hole
120: connection shaft
130: brake pad
140: inclination control plate
141: brake pad mounting groove
142: hinge screw through hole
143: coupling screw through hole
150: washer bushing
151: through hole
160: hinge screw
170: coupling screw

DETAILED DESCRIPTION OF THE PREFERRED EMBODIMENT

Now, the detailed technical idea of the present invention in order to accomplish the above objects will be described in more detail with reference to the accompanying drawings.

Figure 9:
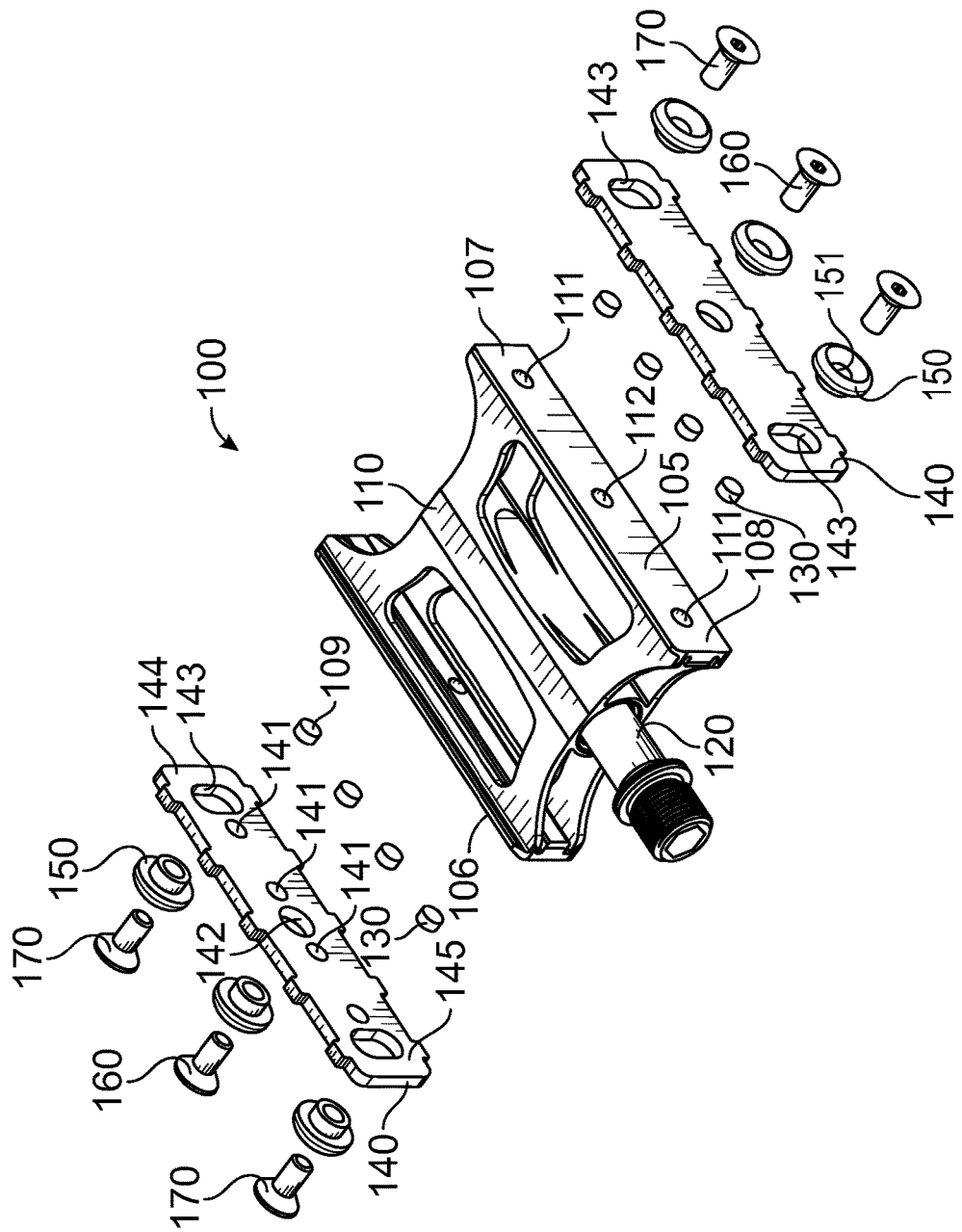
FIG. 9 is an exploded perspective view showing the configuration of a pedal according to the present invention.
Figure 10:
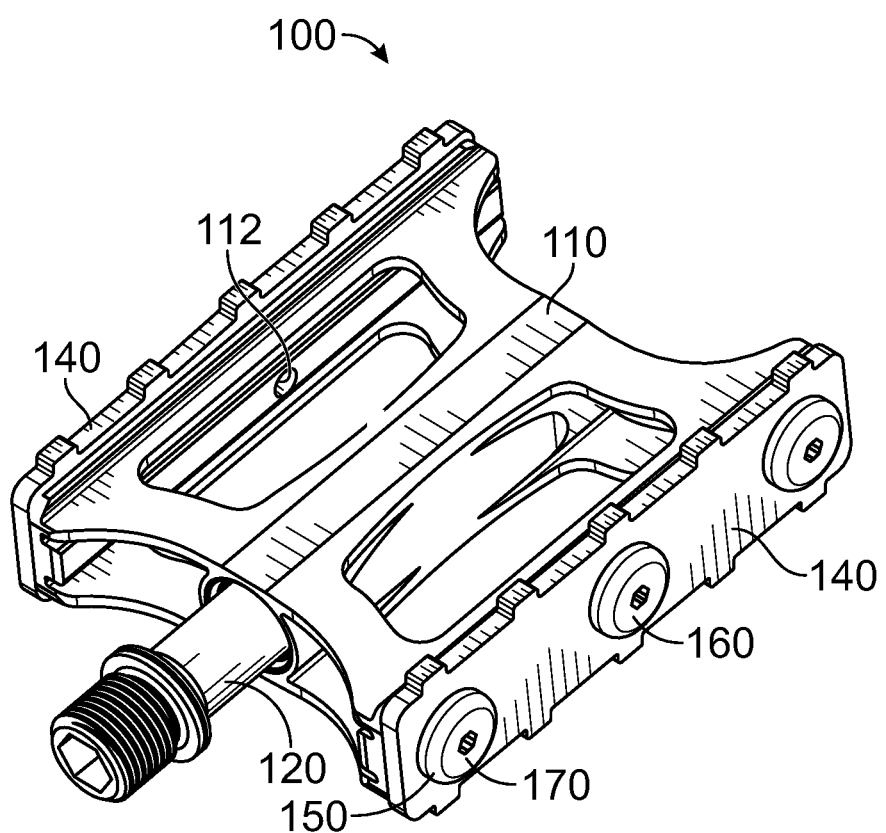
FIG. 10 is a perspective view of the pedal according to the present invention.
Figure 11:
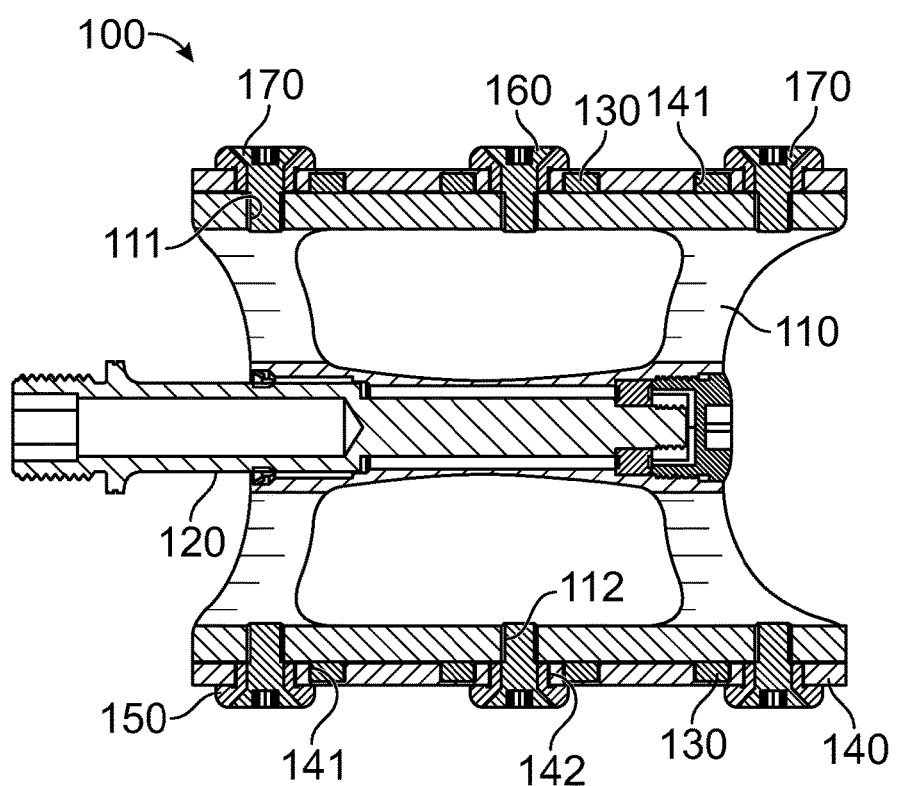
FIG. 11 is a plane view showing the configuration of the pedal according to the present invention.
Figure 12:
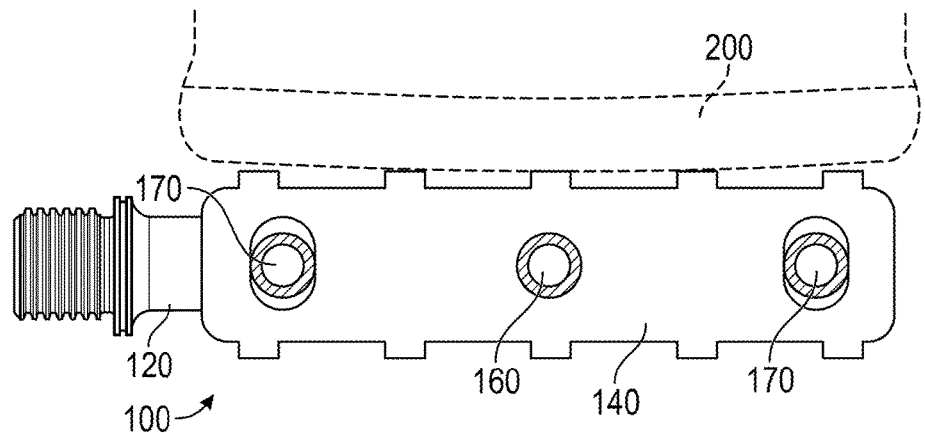
FIG. 12 is a front view showing the pedal according to the present invention.
Figure 13:
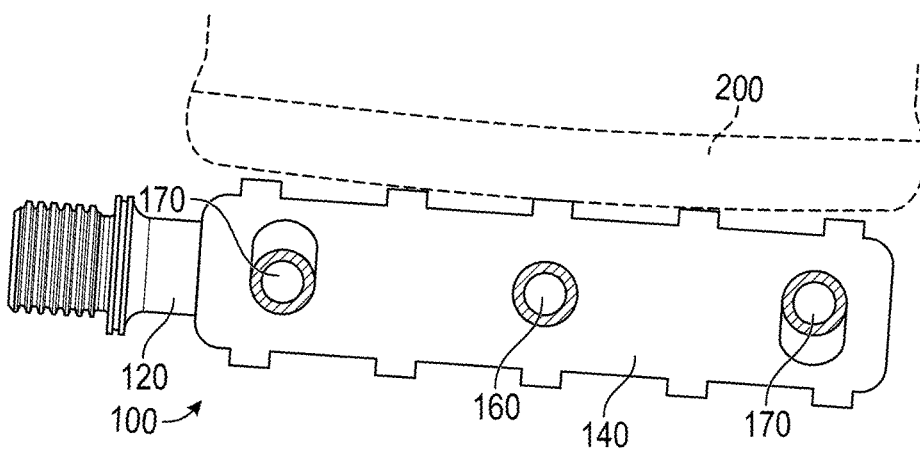
FIG. 13 is a front view showing a state, in which the pedal of the present invention is used by a user having the varus.
Figure 14:
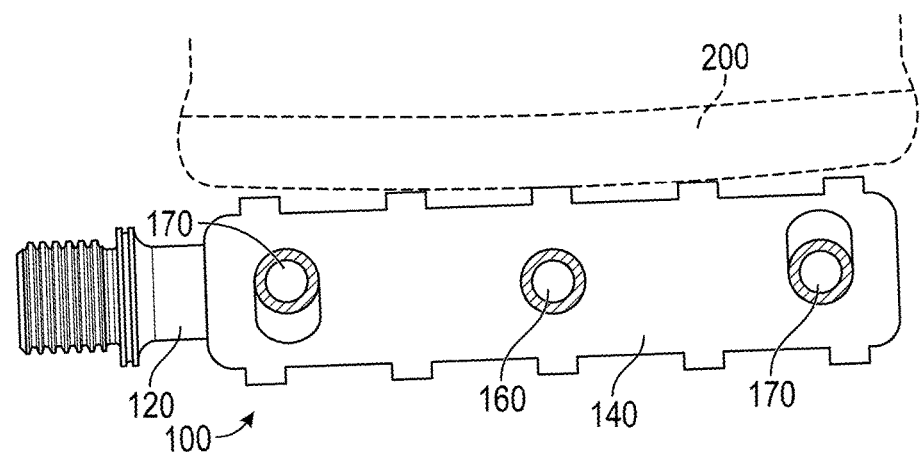
FIG. 14 is a front view showing a state, in which the pedal of the present invention is used by a user having the valgus.

FIG. 9 is an exploded perspective view showing the configuration of a pedal according to the present invention, FIG. 10 is a perspective view of the pedal according to the present invention, FIG. 11 is a plane view showing the configuration of the pedal according to the present invention, FIG. 12 is a front view showing the pedal according to the present invention, FIG. 13 is a front view showing a state, in which the pedal of the present invention is used by a user having the varus, and FIG. 14 is a front view showing a state, in which the pedal of the present invention is used by a user having the valgus.

Referring to FIG. 9 to FIG. 12, a pedal according to the present invention includes a connection shaft 120 coupled to a crank rod of pedal exercise equipment, such as the crank rod 200' shown in FIG. 1, a pedal body 110 rotatably coupled to the connection shaft 120, a plurality of brake pads 130 provided at a predetermined interval from each other on the front surface 105 and the rear surface 106 of the pedal body 110 such that one side surface 109 of each of the plurality of brake pads 130 is in contact with the front surface or the rear surface of the pedal body 110, each inclination control plates 140 provided at the front surface and the rear surface of the pedal body 110 such that both a right side portion 144 and left side portion 145 of the inclination control plate 140 can move in the vertical direction during the rotation with respect to a hinge screw 160 in a state, in which the other side portion of the brake pad 130 is inserted and fixed into one surface thereof, and each coupling screw 170 penetrating the both right and left side end portions of the inclination control plate 140 and coupled to both the right and left side end portions of the front surface and the rear surface of the pedal body 110.

Meanwhile, the inclination control plate 140 has a plurality of brake mounting grooves 141, which are formed on one side surface thereof and into which the other side portions of the brake pads 130 are inserted and fixed, a hinge screw through hole 142, which is formed in the center thereof and into which the hinge screw 160 is inserted, and coupling screw through holes 143 formed in the shape of an elongated hole by penetrating both the right and left end portions of the inclination control plate 140.

In addition, hinge screw coupling holes 112 are respectively formed in the center portions of the front surface and the rear surface of the pedal body 110 such that the hinge screws 160 penetratingly inserted into the hinge screw through holes 142 of the inclination control plates 140 are coupled to the hinge screw coupling holes 112, and coupling screw holes 111 are formed in both the right and left side portions of the front surface and the rear surface of the pedal body 110, which has the hinge screw coupling hole 112, such that the coupling screws 170 penetratingly inserted into the coupling screw through holes 143 of the inclination control plates 140 are coupled to the coupling screw coupling holes 111.

Meanwhile, washer bushings 150 are respectively formed with a through hole 151 having the same center and the same inner diameter as the hinge screw coupling holes 112 and the coupling screw coupling holes 111, and inserted into the hinge screw through holes 142 and the coupling screw through holes 143 in the shape of an elongated hole, which are formed in the inclination control plates 140, such that the hinge screws 160 and the coupling screws 170 can respectively pass through the inside of the through holes (151).

As for the pedal 100 according to the present invention as configured above, each of the inclination control plates 140 are maintained in the assembled state at the front and rear sides of the pedal body 110 by coupling the hinge screws 160 to the hinge screw coupling holes 112, which are formed in the pedal body 110, through the hinge screw through holes 142, which are formed in the center portions of the inclination control plates 140, and screw-coupling the coupling screws 170 to the coupling screw coupling holes 111, which are formed in the pedal body 110, through the coupling screw through holes 143, which are formed in the shape of an elongation hole at both right and left sides of the inclination control plates 140.

Herein, the brake pads 130 are maintained in close contact with the front surface and the rear surface of the pedal body 110 at one side of each of the brake pads 130 in a state, in which the other side of each of the brake pads 130 are fixed on the brake pad mounting grooves 141, which are formed to be depressed on one side surface of each of the inclination control plates 140.

Meanwhile, the washer bushings 150 have the through holes 151, which are penetratingly formed and have the same center and the inner diameter as the hinge screw coupling holes 112 and the coupling screw coupling holes 111, and are provided in the hinge screw through holes 142 and the coupling screw through holes 143, which are formed in the inclination control plates 140, the coupling screw through holes 143 being formed in the shape of an elongation hole. Since the hinge screws 160 and the coupling screws 170 are coupled to the hinge screw coupling holes 112 and the coupling screw coupling holes 111 in a state, where the washer bushings 150 as described above are provided in the hinge screw through holes 142 and the coupling screw through holes 143, when the inclination control plates 140 are moved up and down with respect to the hinge screws 160, the inclination control plates 140 are moved and maintained in a fixed state by the washer bushings 150 and the brake pads 130.

For this reason, when a user of the varus, whose force (pressure) concentrated between the pedal 100 and the foot is biased outwards, uses the pedal, as shown in FIG. 13, the inclination control plate 140 is slightly pivoted about the hinge screw 160, the left side of the inclination control plate 140 opposite to the crank rod is moved upwards, and the right side of the inclination control plate 140 is moved downwards so as to be protruded to the inside of the pedal body 110 so that the force concentrated between the pedal 100 and the foot 200 is automatically adjusted so as not to be biased inwards.

Meanwhile, when a user of the valgus, whose force concentrated between the pedal 100 and the foot 200 is biased inwards, uses the pedal, as shown in FIG. 14, the inclination control plate 140 is pivoted about the hinge screw 160, the left side of the inclination control plate 140 opposite to the crank rod is moved downwards, and the right side of the inclination control plate 140 is moved in the upward direction of the pedal body 110 so that the force concentrated between the pedal 100 and the foot 200 is adjusted so as not to be biased outwards.

At this time, as for the inclination control plate 140, which has rotated about the hinge screw 160, is maintained in the rotated state with one side thereof, which is in contact with the pedal body 110, and the other side, which is supported by the brake pads 130 and the washer bushings 150 provided on the brake pad mounting grooves 141.

Although the present invention has been described in detail by reference to the forgoing embodiments and accompanying drawings, the present invention is not limited thereto and it is apparent to those skilled in the art that various changes and modifications of the present invention may be made without departing the spirit and scope of the invention.

What is claimed is:

1. A pedal comprising:
a connection shaft configured to be coupled to a crank rod of a pedal exercise equipment;
a pedal body rotatably connected to the connection shaft and extending from the connection shaft in a horizontal direction, wherein the pedal body comprises a front surface and a rear surface;
a plurality of brake pads provided at a predetermined interval from each other on the front surface and the rear surface of the pedal body such that one side surface of each of the plurality of brake pads is in contact with the front surface or the rear surface of the pedal body; and
inclination control plates respectively positioned at the front surface and the rear surface of the pedal body, and having a plurality of brake mounting grooves which are formed on one surface thereof positioned adjacent to the front surface and the rear surface of the pedal body and into which the brake pads are inserted and fixed, a hinge screw through hole formed in the center thereof, and coupling screw through holes formed in the right side and left side portions of the inclination control plates, wherein the coupling screw through holes are in the shape of elongated holes, wherein a hinge screw is screw-coupled in a hinge screw coupling hole of the pedal body and the hinge screw through hole of the inclination control plate and a coupling screw hole is screw-coupled in a coupling screw coupling hole of the pedal body and the coupling screw through hole of the inclination control plate such that both the right side and left side portions of the inclination control plate pivot about the hinge screw in a vertical direction with respect to the pedal body.

2. The pedal according to claim 1, wherein washer bushings are disposed in the hinge screw through holes and the coupling screw through holes of the inclination control plates, such that the hinge screw and the coupling screw respectively pass through the washer bushings to couple the inclination control plates to the pedal body.

* * * * *